United States Patent [19]

MacDonald

[11] Patent Number: 5,074,657

[45] Date of Patent: Dec. 24, 1991

[54] TIMING ADJUSTMENT FOR REVERSE MOVIE PHOTOGRAPHY

[75] Inventor: Ronald G. MacDonald, Burbank, Calif.

[73] Assignee: Panavision, Inc., Tarzana, Calif.

[21] Appl. No.: 439,497

[22] Filed: Nov. 21, 1989

[51] Int. Cl.⁵ .............................................. G03B 9/10
[52] U.S. Cl. .................................. 352/216; 352/164; 352/165; 352/173
[58] Field of Search ............... 352/160, 163, 164, 165, 352/173

[56] References Cited

U.S. PATENT DOCUMENTS

| | | | |
|---|---|---|---|
| 1,355,569 | 10/1920 | Power | 352/163 |
| 1,455,393 | 5/1923 | Doherty | 352/164 |
| 1,543,597 | 6/1925 | Brautigam | 352/163 |
| 1,746,385 | 2/1930 | Dina | 352/164 |
| 1,854,504 | 4/1932 | Dina | 352/165 |
| 2,017,589 | 10/1935 | Dina | 352/164 |
| 2,260,569 | 10/1941 | Holmes | 352/164 |
| 2,974,840 | 3/1961 | Kuhnert et al. | 352/160 |
| 3,447,868 | 6/1969 | Krumbein | 352/173 |
| 3,675,996 | 7/1972 | Wilsch et al. | 352/173 |

FOREIGN PATENT DOCUMENTS

| | | | |
|---|---|---|---|
| 754315 | 11/1933 | France | 352/164 |
| 8201 | of 1916 | United Kingdom | 352/165 |

Primary Examiner—Monroe H. Hayes
Attorney, Agent, or Firm—Lyon & Lyon

[57] ABSTRACT

A method and mechanism for adjusting the timing of a camera in the reverse mode while allowing for separate adjustment of the timing in the forward mode. In a preferred embodiment, an external switch is provided which when actuated switches the camera between the timing setting for the forward direction and the timing setting for the reverse direction. A helical driven gear which engages a drive gear driven by the motor is axially translatable between a first position corresponding to the forward direction and a second position corresponding to the reverse direction. Since it is a helical gear, the amount of axial translation adjusts the relative angular position of the shutter with respect to the frame advance mechanism.

13 Claims, 3 Drawing Sheets

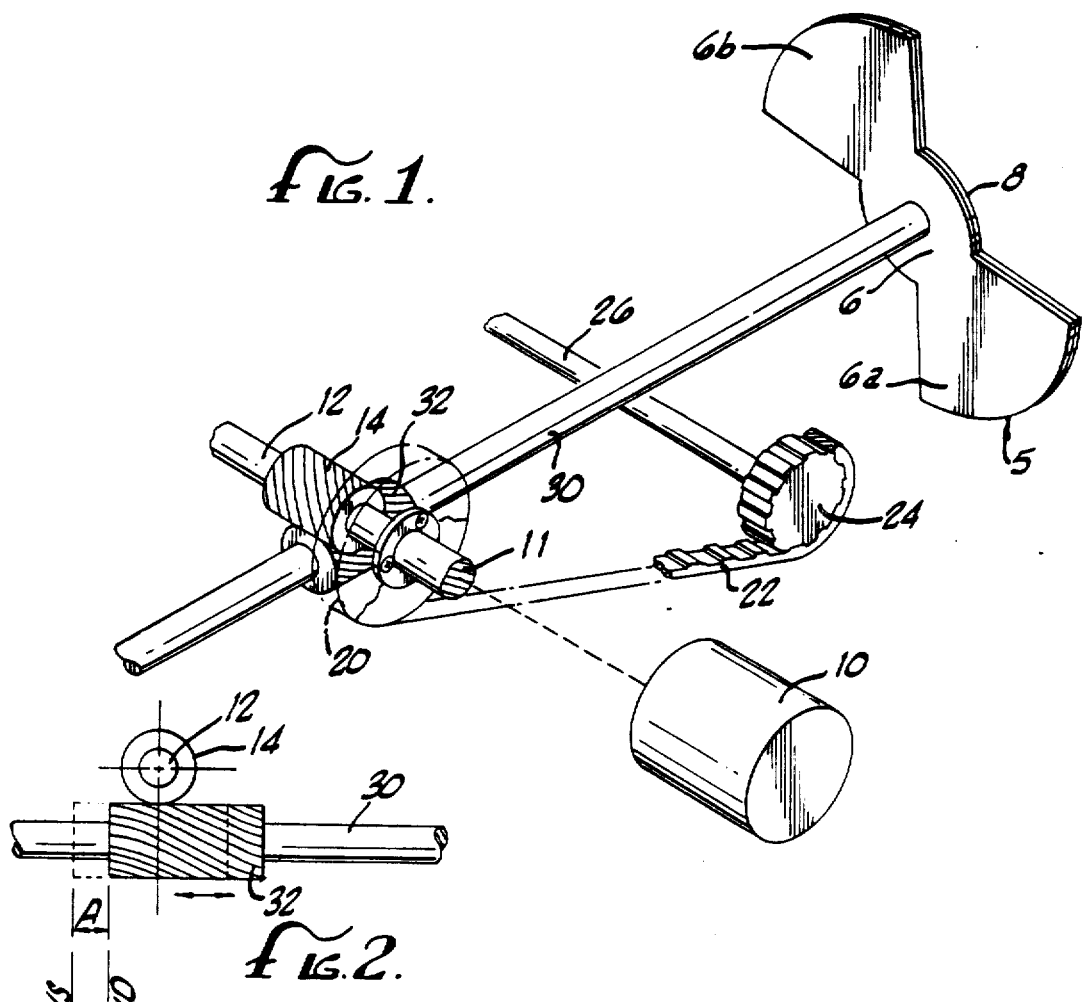
fig. 1.
fig. 2.
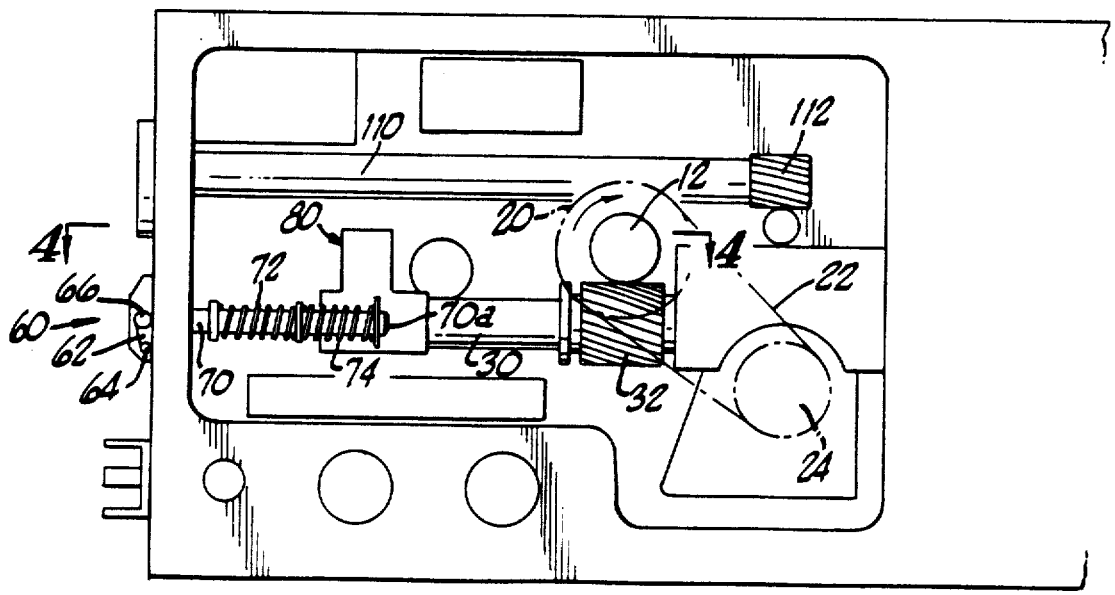
fig. 3.

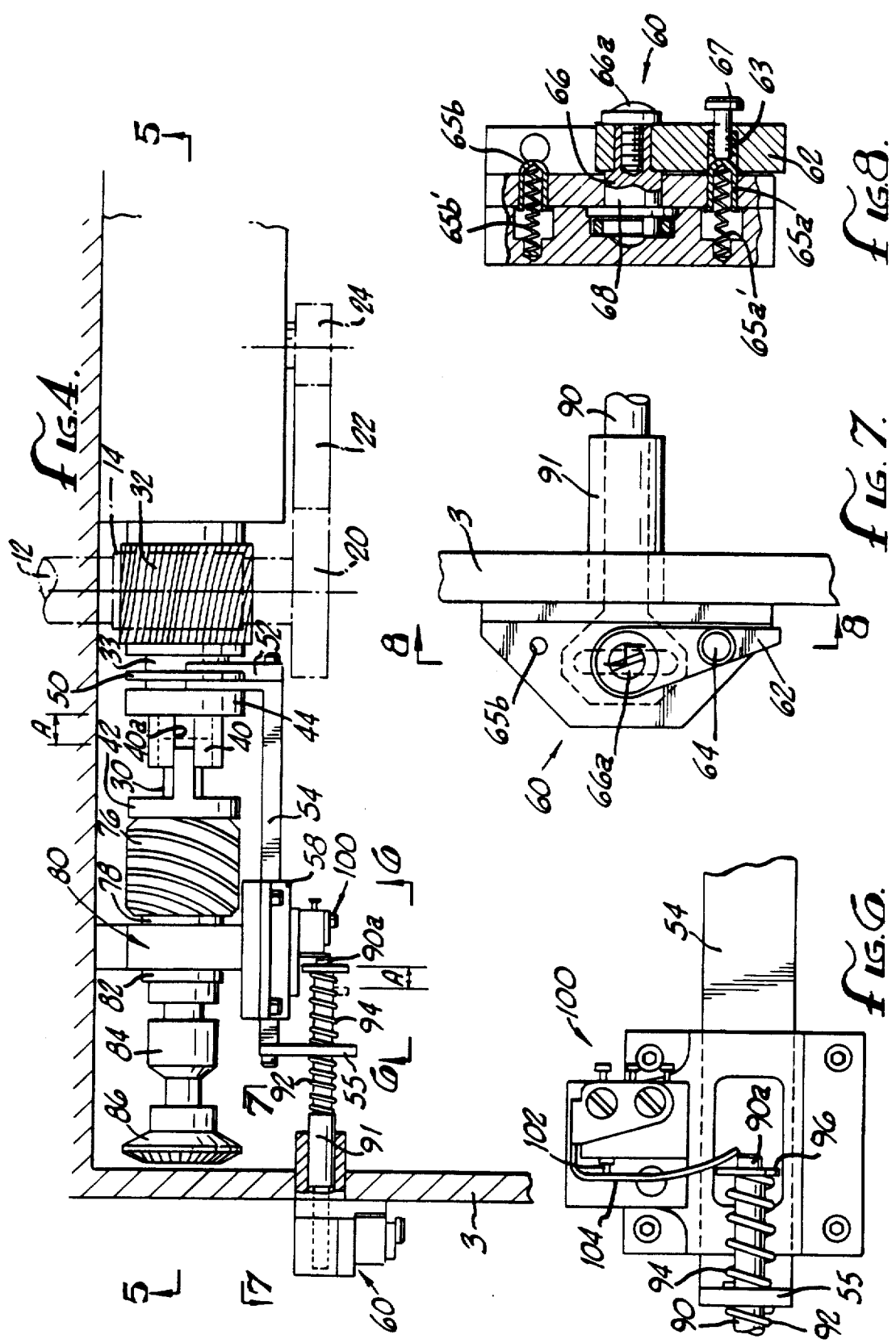

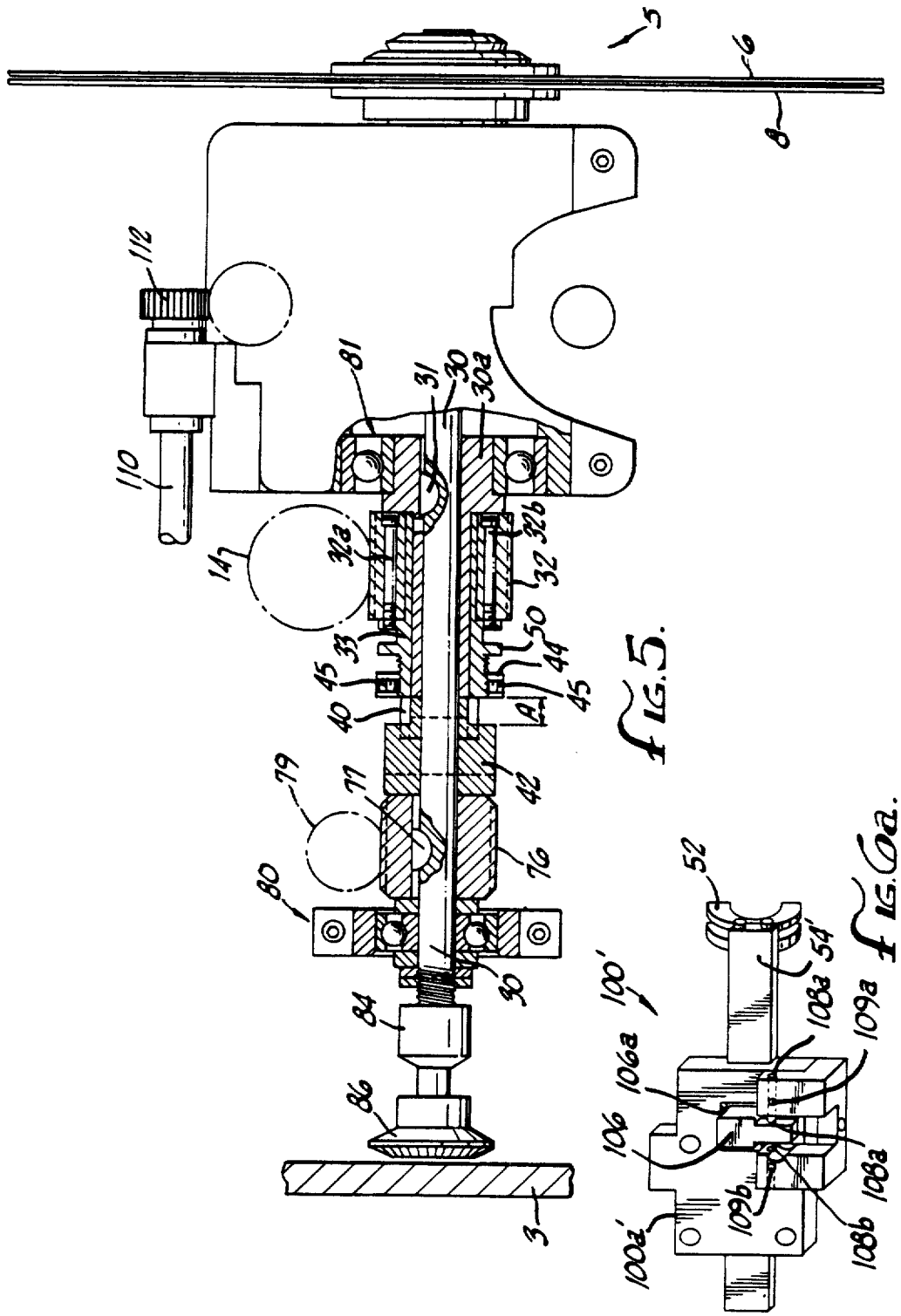

TIMING ADJUSTMENT FOR REVERSE MOVIE PHOTOGRAPHY

BACKGROUND OF THE INVENTION

The present invention relates to adjustment mechanisms for movie cameras, particularly for mechanisms and methods for performing the timing function, that is the synchronization of the shutter movement to the film advance.

In movie cameras, film is moved behind a rotating shutter, the shutter selectively opening for a given period of time (i.e., exposure) and then closing, the film then moving to the next frame placing it in position for subsequent exposure. The exposure process is incrementally repeated.

It is very important that the film advance and the shutter be properly timed so that each film frame is stationary during exposure. Due to backlash or play between the related gears, pulleys, belts and the like, each camera needs to be individually timed to synchronize the shutter with the film advance mechanism.

A camera configuration is illustrated in FIG. 1. A motor 10 rotates a motor shaft 11 which through various gears and pulleys rotates the shutter 5 and the film advance mechanism (not shown). A helical drive gear 14 and a drive pulley 20 are mounted on a main drive shaft 12, the pulley 20 being coupled to and driven by the motor shaft 11. The helical drive gear 14 engages a helical driven gear 32 which is mounted upon a shutter drive shaft 30. On the opposite end of the shutter shaft 30 is mounted the shutter 5 which rotates therewith. The drive pulley 20 rotates a timing belt 22 which in turn rotates the driven pulley 24 which is mounted upon a drive shaft 26 which in turn supplies the driving force for the film advance mechanism. The shutter mechanism and the film advance mechanism both being driven off of the motor shaft 12 run at a synchronous speed. In order to obtain a proper timing due to play in the gear and/or belts, the angular position of the drive pulley 20 upon the main drive shaft 12 may be adjusted in order to properly time the film advance mechanism to the shutter 5. Once adjusted, the timing is set for that direction of rotation.

However due to special effects and other cinematographic techniques, it is desirable to film in reverse. The preferred reverse filming actually has the camera itself running in reverse. Due to the configuration of the gears and/or belts the amount of play in the reverse direction is different than that experienced in the forward direction so that the camera that is correctly timed in the forward direction is not correctly timed in the reverse direction.

To accommodate timing in the reverse direction, the camera can be run in reverse and the timing set by adjusting the rotational position of the drive pulley 20. However this timing adjustment must be done at the lab bench and is not conducive for adjustment in the field. Therefore if the director wishes to film a particular scene in reverse, he must either have a separate camera for filming the reverse filming scene or send his camera back to the lab to be timed for the reverse shots. Alternately, there are filming instances depending upon the film speed, exposure, or particular filming technique, where a small shutter angle may be set, the camera need not be adjusted between forward and reverse modes. However, depending upon filming conditions, especially at higher speeds, larger shutter angles and when using certain lighting techniques, it is very important to adjust the timing independently for both the forward and reverse modes.

SUMMARY OF THE INVENTION

The present invention is directed to a method and mechanism for adjusting the timing of a camera in the reverse mode while allowing for separate adjustment of the timing in the forward mode. In a preferred embodiment, an external switch is provided which when actuated switches the camera between the timing setting for the forward direction and the timing setting for the reverse direction. A helical driven gear which engages a drive gear driven by the motor is axially translatable between a first position corresponding to the forward direction and a second position corresponding to the reverse direction. Since it is a helical gear, the amount of axial translation adjusts the relative angular position of the shutter with respect to the frame advance mechanism.

BRIEF DESCRIPTION OF THE DRAWINGS

FIG. 1 illustrates a general configuration of interconnection between the drive mechanism of a camera shutter and the film advance mechanisms according to the present invention;

FIG. 2 is a side elevation view of the gear connection between the motor shaft and the shutter shaft;

FIG. 3 is a diagrammatic side elevation view of internal gearing mechanisms of a movie camera;

FIG. 4 is a detailed view of the camera shutter drive mechanism including the reverse timing according to the present invention;

FIG. 5 is a partial cross sectional view of FIG. 4 taken along the line 5—5;

FIG. 6 is a elevational view of FIG. 5 taken along the line 6—6;

FIG. 6a is an preferred embodiment of the adjustment means shown in FIG. 6;

FIG. 7 is a partial cross sectional view of FIG. 4 taken along the line 7—7; and FIG. 8 is a cross sectional view of FIG. 7 taken along the line 8—8.

DETAILED DESCRIPTION OF THE PREFERRED EMBODIMENT

A preferred embodiment will now be described in detail with reference to the drawings. To assist in describing the following mechanisms, any numeral representing an element in one figure will represent the same element in any other figure.

FIG. 1 illustrates a perspective view of the drive mechanism of a movie camera. A motor 10 rotates a motor shaft 11 to which the drive pulley 20 is coupled. The helical drive gear 14 and the drive pulley 20 are mounted on a main drive shaft. The drive pulley 20 in turn rotates a timing belt 22 which wraps around and drives a driven pulley 24 which in turn rotates a drive shaft 26 for operating the film advance mechanism (not shown). The helical drive gear 14 engages and rotates a helical driven gear 32, the helical driven gear 32 being mounted on a shutter shaft 30. The shutter 5 is mounted on the end of the shutter shaft 30 and is rotated thereby. The shutter 5 is shown to comprise 2 separate shutters, the main shutter 6 and the adjustable shutter 8. Each shutter, such as shutter 6, includes shutter elements 6a and 6b forming an aperture therebetween. The adjustable shutter 8 is adjustable to rotate relative to shutter 6 selectively closing off portions of the aperture thereby controlling exposure.

As diagrammatically shown in FIG. 3, the adjustable shutter 8 is adjusted, changing the aperture, by rotation of the adjusting shaft 110 which in turn rotates a gear 112 which is operably connected by suitable means to adjust the relative position of the main shutter 6 to the adjustable shutter 8.

The timing of the drive mechanism to correspond the film advance mechanism to the shutter 5 may be accomplished by angularly adjusting the position of the drive pulley 20 on the main drive shaft 12. The camera is then run to test whether the timing is correct and the adjustment repeated until proper timing is achieved. Alternatively, the angular position of the drive pulley 24 may be adjusted to set the timing. Other timing methods such as adjusting the position of the belt 22 may be employed by those skilled in the art.

FIG. 2 illustrates a means for adjusting the axial position of the helical driven gear 32 on the shutter shaft 30. The helical driven gear 32 actually slides along the shutter shaft 30 and as it does the helical configuration of the gear teeth causes the shutter shaft 30 to be rotated relative to the helical drive gear 14 which is mounted on the main drive shaft 12. Therefore axial translation of the helical driven gear 32 may be used to adjust the relative position of the shutter 5 with respect to the film advance mechanism, that is, set the timing. FIG. 2 illustrates the helical driven gear 32 in solid line to be in the forward direction setting and in the dotted line to be in the reverse direction setting. The axial translation or gap "A", which is approximately ⅛ inch, may be adjusted to set the proper timing. With the helical driven gear 32 in the forward direction setting, the timing on the camera may be set as described above and is unaffected by any adjustment of the gap "A". If the camera is to be run in the reverse direction, the helical driven gear 32 is moved the amount "A" to the reverse position. The amount of gap "A" is selected so that proper timing is achieved in the reverse direction. The gap "A" is adjusted until tests reveal that proper timing has been achieved in the reverse direction. By merely shifting the helical gear 32 from one position to the other, the same camera has the capability of providing precise timing for both forward and reverse directions.

FIGS. 3-8 illustrate details of the adjustment mechanisms for the helical driven gear 32. As previously described with respect to FIG. 1, the main drive shaft 12 having the pulley 20 mounted on one end rotates the driven pulley 24 through the timing belt 22 for driving the film advance mechanism. The helical drive gear 14 is mounted on the main drive shaft 12 and engages and rotates the helical driven gear 32. The helical driven gear 32 is mounted on a sleeve or hub 33 which is concentric and axially translatable along the shutter shaft 30. A slide fork 40 is mounted on an end of the sleeve 33 opposite to the helical driven gear 32. A slide fork 40 includes a slot 40a which accepts insertion of the shift key 42. The shift key 42 being slidably insertable into the slide fork 40 allows for the axial translation of the sleeve 33 along the shaft 30 while simultaneously preventing any relative rotational movement therebetween. A nut 44 is secured to the slide fork 40, the position of the nut 44 being axially adjustable along the slide fork 40 to allow selection of the gap "A", that is the amount of axial translation of the sleeve 33 from the forward direction setting or position to the reverse position. When being moved to the reverse direction setting or position, the sleeve 33 stops when the nut 44 contacts the outer edge of the shift key 42. Therefore timing is set by selecting the position of the nut 44 along the slide fork 40. The position of the nut 44 does not affect the position of the helical driven gear 32 when the mechanism is in the forward position. The forward-/reverse switch or actuator 60 is positioned on the outside of the camera wall 3 to allow for convenient accessibility. Manipulating the actuator 60 will cause the helical driven gear 32 to be moved between the forward and the reverse positions. A shift 50 attached to the sleeve 33 is engaged by a shifting fork 52 mounted on slide fork 54.

The external switch 60 switches the camera from between the forward direction setting and the reverse direction setting. As best viewed in FIGS. 7 and 8 the switch 60 includes a switch handle 62 which rotates about an actuator shaft 66. The switch handle 62 is mounted in place by a locking screw 66a. Switch handle 62 is free to pivot about the actuator shaft 66 but has lock positions at both the forward and the reverse direction settings. The lock position is accomplished by plunger 65a and 65b which protrude up into a corresponding guide channel 63 within the switch handle 62. In order to release the switch handle 62 a release pin 67 is depressed urging the plunger 65a downward thereby compressing the spring 65a' which urges the plunger 65a into a locking position. Once the plunger 65a has been pushed below the edge of the switch handle 62, the switch handle 62 may be rotated, clockwise as in FIG. 7, thereby switching the camera between the forward and reverse direction settings. Once the handle 62 reaches the opposite side, the plunger 65b is depressed, compressing spring 65b', until the plunger reaches and moves into the guide 63 locking the switch handle 62 in place in the new position.

The pivoting end of the switch handle 62 includes a cam or eccentric which abuts the actuator shaft 90. Therefore as the switch handle 62 is actuated, the cam is rotated causing the shaft 90 to be axially translated. The shaft 90 runs between the switch handle 62 and the actuator switch 100. Springs 92 and 94 on either side of fork 55 (as best viewed in FIGS. 4, 5 and 6) urge the end 90a of the shaft 90 against the switch actuator 100. The fork 55 is operably attached to the shaft 90, axially moving therewith. Therefore as the switch handle 62 is actuated, the shaft 90 axially translates moving the fork extension 55 which in turn moves the slider fork 54, in turn translating the shift 50 and moving the helical driven gear 32 between the forward and reverse direction.

Simultaneously as the fork 55 is moved, the shaft end 90a contacts an arm 104 in the switch actuator 100, the arm 104 engaging a plunger 102 on the switch actuator 100. When the shaft 90 moves to the left (as viewed in FIG. 6) the switch 100 is in the off position indicating reverse direction setting. When the shaft 90 is moved to the right (as in FIG. 6) the switch 100 is activated indicating the forward direction setting. The switch can therefore send a signal for various camera functions indicating which film direction is being selected. The switch actuator 100 then sends the signal for switching operation mode.

FIG. 5 is a cross sectional view of the mechanism illustrated in FIG. 4 showing further details of the elements. The shaft 30 is supported by and rotates within bearings 80 and 81. A spacer 30a is attached to the shutter shaft 30 by a Woodruff key 31.

The sleeve 33 is concentrically mounted onto the spacer 30a and is allowed to axially translate therealong. The sleeve 33 includes a threaded end onto which the adjusting nut 44 is threadably mounted secured in place thereto by set screws 45,45. The sleeve 33 also includes the shift 50 which is merely an extending collar-like portion which can be engaged by the slider fork 52 (of FIG. 4) for actuation. The helical driven gear 32 is also secured to the sleeve 33, locked in place by bolts 32a and 32b.

The gear and hub subassembly is made up of the elements which can axially translate including the sleeve or hub 33, the adjusting nut 44 and the helical driven gear 32. The elements can selectively axially translate a distance "A" until the adjusting nut 44 contacts the shift key 42.

A worm gear 76 is also attached to the shutter shaft 30, being secured thereto by Woodruff key 77. The worm gear 76 engages and rotates a sprocket gear 79 to provide other camera functions.

A threading knob 86 is attached onto the end of the shutter 5 to allow manual adjustment of the movement, shutter, and mirror position, typically while the camera is not running.

The above embodiment describes a combination where the timing of the forward direction is set by pulley adjustment and the reverse direction is set by adjustment of the stop nut 44. The timing function may be alternately performed such as setting the timing of the reverse direction by pulley adjustment. The present invention provides for separate timing settings for two filming settings such as forward and reverse. The present invention may also be employed for other filming settings such as a timing setting for standard forward and an alternate timing setting for a forward, special effects mode.

An alternate preferred embodiment for adjusting gap "A" (in place of adjusting nut 44) is shown in FIG. 6a where the adjustment is provided within the switch actuator 100'. The elements of FIG. 6a are the same as those in FIG. 6 except for the additional adjustment feature for the slide fork 54'. The slide fork 54' is attached to a stopping block 106 which protrudes outward into a slot 106a in the shift actuator body 100a'. The stopping position of the slide fork 54' (and therefore the gap "A") is adjusted by setting the position of the hex bolts 108a and 108b on either side of the stopping block 106. The hex bolts 108a and 108b are locked in place by tightening hex bolts 109a and 109b respectively. In fact, this embodiment allows both the rearward and forward stopping positions to be set, the position of hex bolt 108b setting the rearward stopping position and the position of hex bolt 108a setting the forward stopping position of the shifting fork 52.

Thus a movie camera with a timing mechanism capable of providing independent timing adjustment to both the forward and in the reverse directions has been shown and described. Though specific embodiments, uses and advantages have been described, many modifications and advantages may become obvious to one skilled in the art from the descriptions herein. The invention therefore is to be limited only in the spirit of the claims that follow.

I claim:

1. A movie camera comprising
a motor;
a main drive shaft operably connected to and rotated by said motor;
a drive pulley mounted on said main drive shaft and operably connected to a film advance mechanism;
means for adjusting timing of the shutter with respect to the film advance mechanism for a first direction of operation;
a drive gear mounted on said main drive shaft;
means for independently adjusting timing of the shutter with respect to the film advance mechanism for a second opposite direction of operation comprising (a) a shutter drive shaft having a helical driven gear mounted thereon for rotation therewith, said helical driven gear engaging said drive gear, said helical driven gear being adapted to be axially translatable along said shutter drive shaft between a first stop position and a second stop position and (b) means for adjusting the second stop position of the helical drive gear,
wherein at a setting of said first stop position, the camera is properly timed for the first direction of operation and at a setting of said second stop position, the camera is properly timed for the second opposite direction of operation, and
wherein the setting of the second stop position does not affect timing for the first direction of operation.

2. The movie camera of claim 1 further comprising (1) a sleeve slidably mounted on said shutter drive shaft, said helical driven gear being attached to said sleeve, (2) a shift key mounted on said shutter drive shaft and having an extending portion, (3) a slide portion in said sleeve for accepting said extending portion of said shift key as said sleeve slides along said shutter drive shaft, and (4) a stop nut slidably mounted on said sleeve and adapted to be securable to said sleeve at a position to act as a stop against said shift key for said sleeve setting said second position.

3. The movie camera of claim 1 wherein at said first position, the camera is properly timed for the forward direction and at said second position the camera is properly timed for the reverse direction.

4. The movie camera of claim 1 wherein said helical driven gear is axially translatable a distance "A", said distance being selected such that the camera is properly timed for the reverse direction.

5. The movie camera of claim 1 further comprising an actuator means operably connected to said helical driven gear for shifting said helical driven gear between the first position and the second position.

6. In a movie camera having a motor with a main drive shaft operably connected thereto and rotated by the motor, a timing mechanism for providing independently preset timing settings for both forward and reverse directions of operation, comprising
drive means mounted on the main drive shaft for operably driving a film advance mechanism;
means for adjusting timing of the shutter with respect to the film advance mechanism for a first direction of operation;
a drive gear mountable on the main drive shaft;
a shutter drive shaft having a driven gear mounted thereon for rotation therewith, said driven gear engaging said drive gear;
timing means for adjusting relative angular position between said drive gear and said driven gear between a predetermined first position and a predetermined second position; and means for adjusting the predetermined second position of said drive gear, wherein timing of the shutter with respect to the film advance mechanism for the first direction of operation with the relative angular position of the drive and driven gear in the first predetermined position is not affected by adjustment of the predetermined second position for timing of the shutter with respect to the film mechanism for a second opposite direction.

7. The timing mechanism of claim 6 wherein said timing means further comprises means for adjusting the predetermined first position of said drive gear, said driven gear being adapted to be axially translatable along said shutter drive shaft between a first position and a second position, one of said drive gear and said driven gear having a configuration such that relative axial adjustment therebetween also results in a corresponding angular adjustment.

8. The timing mechanism of claim 7 wherein said driven gear comprises a helical gear, the timing mechanism further comprising (1) a sleeve slidably mounted on said shutter drive shaft, said helical driven gear being attached to said sleeve, (2) a shift key mounted on said shutter drive shaft and having an extended portion, (3) a slide portion in said sleeve for accepting said extended portion of said shift key as said sleeve slides along said shutter drive shaft, and (4) a stop nut slidably mounted on said sleeve and adapted to be securable to said sleeve at a position to act as a stop against said shift key for said sleeve setting said second position.

9. The timing mechanism of claim 7 wherein said driven gear comprises a helical gear, the timing mechanism further comprising (1) a sleeve slidably mounted on said shutter drive shaft, said helical driven gear being attached to said sleeve, (2) a shift key mounted on said shutter drive shaft and having an extended portion, (3) a slide portion in said sleeve for accepting said extended portion of said shift key as said sleeve slides along said shutter drive shaft, and (4) an actuation means for moving said sleeve between the first position and the second position, said actuation means including a means for setting said second position of said sleeve.

10. The timing mechanism of claim 7 wherein at said first position, the camera is properly timed for the forward direction and at said second position the camera is properly timed for the reverse direction.

11. The movie camera of claim 7 wherein said driven gear is axially translatable a distance "A", said distance being selected such that the camera is properly timed for the reverse direction.

12. A method for pre-setting the timing of a movie camera to be run in both the forward and the reverse directions, the timing for each respective direction being independently preset and once preset, forward and reverse timing settings are selectable by actuation of a timing actuator, comprising the steps of:

switching a timing actuator to a first direction setting;

setting the timing for the first direction by adjusting relative angular position between a gear or pulley and its respective shaft;

switching the timing actuator to a second direction setting thereby axially translating a helical driven gear, the helical driven gear being mounted on the shutter shaft and being axially translatable between a first axial position corresponding to the first direction setting and a second axial position corresponding to the second direction setting; and independently setting the timing for the second direction by adjusting the second axial position of the helical driven gear such that the setting of the timing of the second direction does not affect the timing setting of for the first direction.

13. A movie camera comprising a motor;

a main drive shaft operably connected to and rotated by said motor;

a drive pulley mounted on said main drive shaft and operably connected to a film advance mechanism;

means for adjusting timing of the shutter with respect to the film advance mechanism for a first direction of operation;

a drive gear mounted on said main drive shaft;

means for independently adjusting timing of the shutter with respect to the film advance mechanism for a second opposite direction of operation comprising (a) a shutter drive shaft having a helical driven gear mounted on the shutter drive shaft for rotation therewith, said helical driven gear engaging said drive gear, said helical driven gear being adapted to be axially translatable along said shutter drive shaft between a predetermined first position and a predetermined second position and (b) means for adjusting the second predetermined position of the helical drive gear, comprising (1) a sleeve slidably mounted on said shutter drive shaft, said helical driven gear being attached to said sleeve, (2) a shift key mounted on said shutter drive shaft and having an extended portion, (3) a slide portion in said sleeve for accepting said extended portion of said shift key as said sleeve slides along said shutter drive shaft, and (4) an actuation means for moving said sleeve between the first position and the second position, said actuation means including a means for setting said second position of said sleeve.

* * * * *